July 6, 1954   B. G. GROSS   2,682,817
FEEDING AND CUTTING DEVICE FOR PHOTOPRINTING APPARATUS
Filed Aug. 22, 1950   4 Sheets-Sheet 1

BEN G. GROSS
INVENTOR

HUEBNER, BEEHLER, WORREL,
& HERZIG
ATTORNEYS

BY Richard M. Worrel

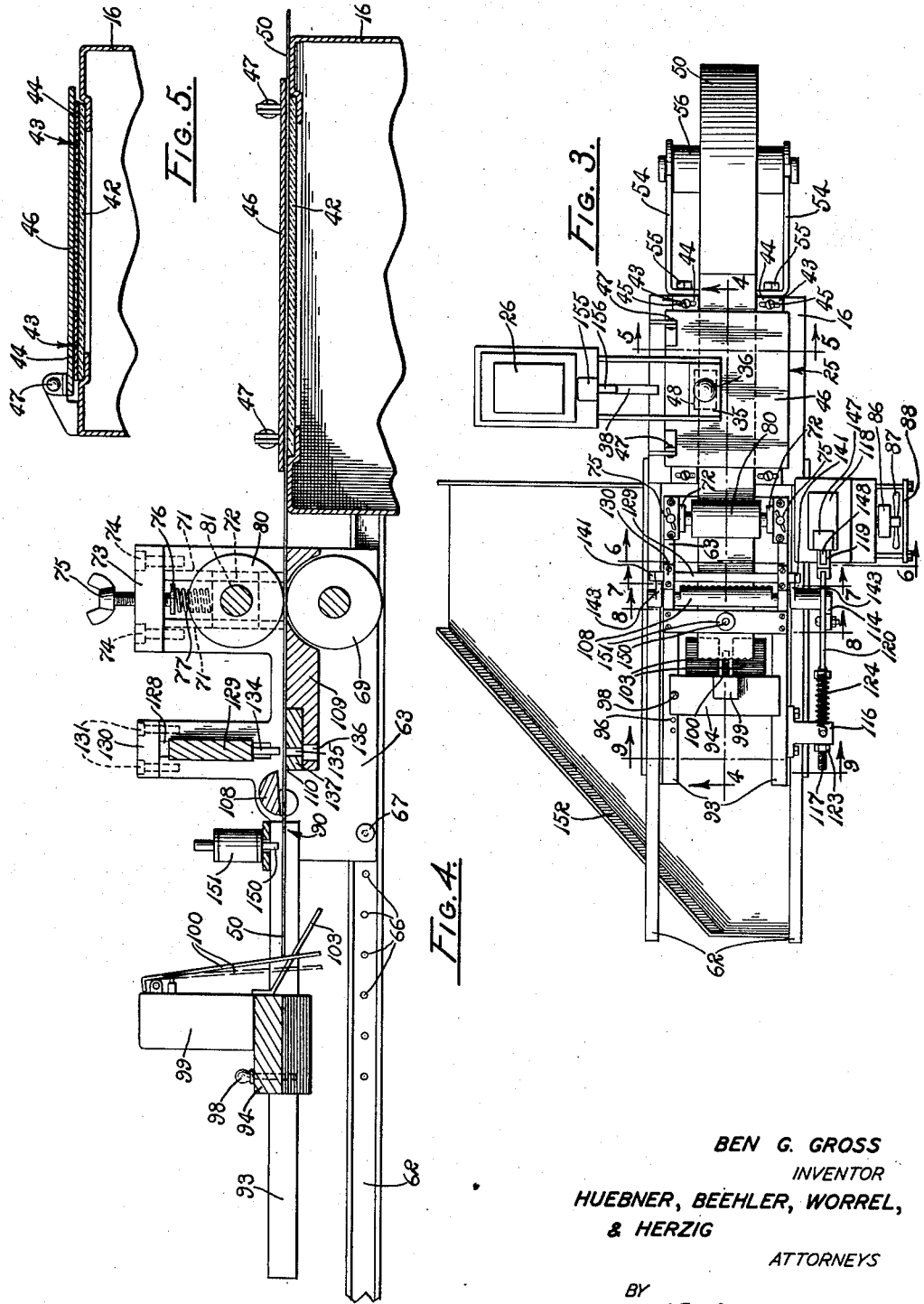

July 6, 1954 B. G. GROSS 2,682,817
FEEDING AND CUTTING DEVICE FOR PHOTOPRINTING APPARATUS
Filed Aug. 22, 1950 4 Sheets-Sheet 4

BEN G. GROSS
INVENTOR
HUEBNER, BEEHLER, WORREL,
& HERZIG
ATTORNEYS

Patented July 6, 1954

2,682,817

UNITED STATES PATENT OFFICE 2,682,817

FEEDING AND CUTTING DEVICE FOR PHOTOPRINTING APPARATUS

Ben G. Gross, Fresno, Calif.

Application August 22, 1950, Serial No. 180,878

3 Claims. (Cl. 95—75)

The present invention relates to photo printing apparatus and more particularly to a combined photo printer and feeding and cutting device for sensitized strip printing material.

In the most modern photo printing shops it is the practice to employ any of the well known photo printing apparatus which provide timed exposure of sensitized printing material by light rays projected through a previously processed negative. After exposure of the sensitized paper it is developed in the usual developing solutions.

Such machines generally provide a source of light, a station adapted to receive photographic negatives, and an exposure station at which the sensitized paper is arranged. The more modern apparatus provides a manually controlled switch for initiating illumination of the negative and exposure of the sensitized material and a timing device which automatically interrupts the light after a predetermined period.

Although such apparatus is a substantial advance over previous devices for the purpose it is subject to certain disadvantages which the subject invention seeks to overcome. An operator of the modern photo printing apparatus carefully arranges a negative in the negative station and a piece of sensitized printing paper at the exposure station, manually closes the switch referred to above, waits for the timing device to regulate completion of the exposure, manually removes the negative, removes the printing paper from the exposure station, and deposits the same in a developing solution. Because of the requisite handling, almost all commercially developed photographic prints bear detectable finger marks. The fact that modern printing competition requires speedy completion, the handling causes more damage to the printing paper than might otherwise occur. The printing operation is obviously slowly performed because of the successive manual operations. It has also been discovered that the commercial photo printing apparatus referred to above is more expensive to operate, less uniform in its results, and more wasteful of time than need be.

It is therefore an object of the present invention to provide a photo printing apparatus having improved operation characteristics.

Another object is to improve the quality, increase the speed, and reduce the cost of photo printing.

Another object is to provide a photo printing apparatus adapted to handle sensitized photo printing paper employed therein in a mechanical, speedy, and uniform manner.

Another object is to provide an automatic feeding and cutting device for strip material.

Another object is to provide an apparatus of the character described that is economical to produce, dependable in its operation and conveniently adjustable to varied operational requirements.

Further objects and advantages will become apparent in the subsequent description in the specification.

In the drawings:

Fig. 3 is a plan view of the combined photo printing apparatus and feeding, cutting and perforating mechanism.

Fig. 4 is a fragmentary longitudinal section of the structure shown in Fig. 4, as taken on line 4—4 thereof.

Fig. 5 is a section taken on line 5—5 of Fig. 3 illustrating a paper guide and holding structure at the exposure station.

Figure 1:
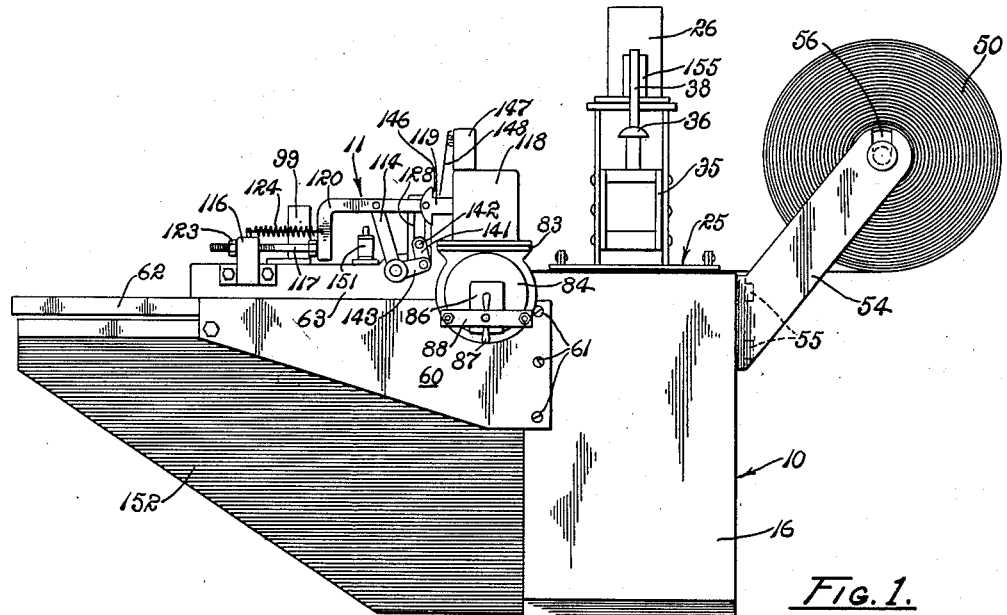
Fig. 1 is a fragmentary elevation of a photo printing apparatus showing in combination therewith a sensitized strip of printing material feeding, cutting and perforating mechanism embodying the principles of the present invention. For illustrative convenience, the supporting table of the photo printing apparatus is shown in fragmentary vertical section.

Referring in greater detail to the drawings:

In Fig. 1, a conventional photo printing apparatus is indicated generally at 10 and the feeding, cutting, and perforating device at 11. The photo printing apparatus includes a table shown in section at 15 supported in any convenient manner, not shown, and a cabinet 16. A lamp housing 17 is supported on the table 15. The lamp housing 17 houses an electric lamp 18 diagrammatically illustrated in Fig. 10. A transparent window 19 is provided in the upper portion of the lamp housing 17 through the table 15. A frame 20 circumscribes the window 19 and defines a negative holding station 21. The frame is preferably pivotally mounted as at 22 for convenient elevation to facilitate insertion and removal of negatives. A transparent pane of glass 23 or the like is mounted in the frame and serves to hold negatives in position at the negative station flatly in precisely predetermined position.

The lamp 18 is adapted to project light rays upwardly through the lamp housing 17 to an exposure station indicated at 25. It is customary in devices of the type to provide a shutter, not shown, within the lamp housing 17 below the exposure station 25. The shutter is conventionally urged by spring means to a position blocking illumination of the exposure station by the lamp. A solenoid 26 is connected by a mechanical link, also not shown, to the shutter and when energized retracts the shutter for illumination of the exposure station by the lamp.

The electric control system shown in Fig. 10 will subsequently be described in greater detail. At this point it is sufficient to observe that a manually manipulable switch 28 is provided in a convenient position and is connected to initiate energization of the lamp 18. A timing device indicated at 29 in Fig. 10 interrupts energization of the lamp after a predetermined period. The solenoid 26 is electrically connected so that it urges the shutter out of the path of the light during the period following operation of the switch 28 and prior to the interruption of the illumination by the timing device.

Figure 2:
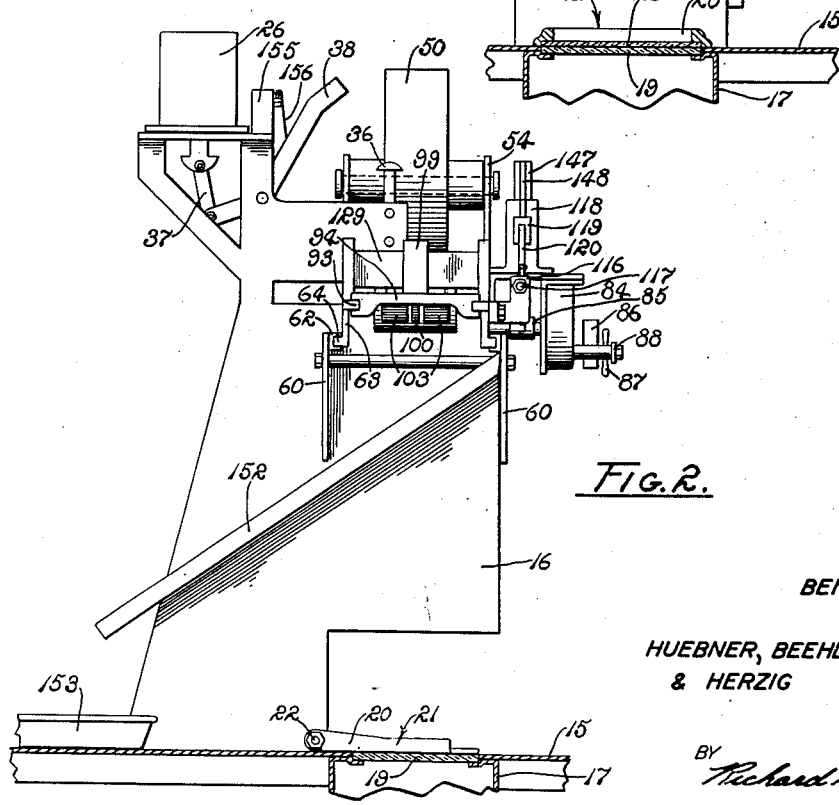
Fig. 2 is an end elevation of the structure shown in Fig. 1 viewed from the discharge end thereof.

It is the conventional practice to number sensitized paper positioned at the exposure station during the exposure thereof. This is conventionally accomplished by means of a consecutive number printing device 35 mounted above the exposure station for reciprocal movement thereto. The printing device provides an operating plunger 36 which when depressed causes the printing device to engage the printing paper at the exposure station and which when released permits retraction from such engagement by resilient means not shown. A mechanical link 37 provides a printing arm 38 pivotally mounted above the operating plunger 36. When the solenoid 26 is energized the arm 38 pivots clockwise, as viewed in Fig. 2, striking the plunger 36 and numbering the printing paper at the exposure station 25. When the solenoid 26 is deenergized, the arm 38 moves counterclockwise to the position shown in Fig. 2 permitting retraction of the printing device 35 from the printing paper.

The structure thus far described is essentially conventional and illustrates a photo printing apparatus of a type with which the feeding, cutting, and perforating device of the subject invention is suitably combined. It is to be understood that the structure recited is not intended to limit the present invention but only suitably to illustrate a photo printer. The printing apparatus itself, because of its well known character, is not described in greater detail herein.

As shown in Figs. 4 and 5, the exposure station 25 is provided with a transparent window 42 against which printing paper is held for exposure. Conventionally the exposure station 25 employs a frame for holding rectangular pieces of printing paper in precise position.

In order to utilize the feeding, cutting, and perforating device 11 such frame is removed and an adjustable guide 43 provided longitudinally of the window 42, as shown in Figs. 3 and 5. The guide conveniently takes the form of a pair of strips 44 mounted in adjustably spaced parallel relation by screws 45 passed through elongated openings in the strips and screw-threadably engaged into the housing 16. A cover plate 46 is pivotally mounted, as at 47, in covering relation to the exposure station and serves to maintain strip frame material between the guides and dependably in position for exposure. An opening 48 is formed through the plate 46 for the printing of numbers on the printing paper therethrough. The pivotal mounting of the cover plate facilitates its elevation for the threading of strip printing paper 50 therethrough.

A bracket 54 is mounted at a side of the photo printing apparatus 10 as at 55 and releasably supports a reel 56 thereon for rotary motion. The strip printing paper 50 is unwound from the reel and threaded through the guide 43 at the exposure station, as previously described. Although the device of the present invention is normally employed in a dark room, a light shield of opaque material is optionally employed about the reel. The shield obviously does not constitute a part of the present invention and thus is not shown in the drawings.

Figure 6:
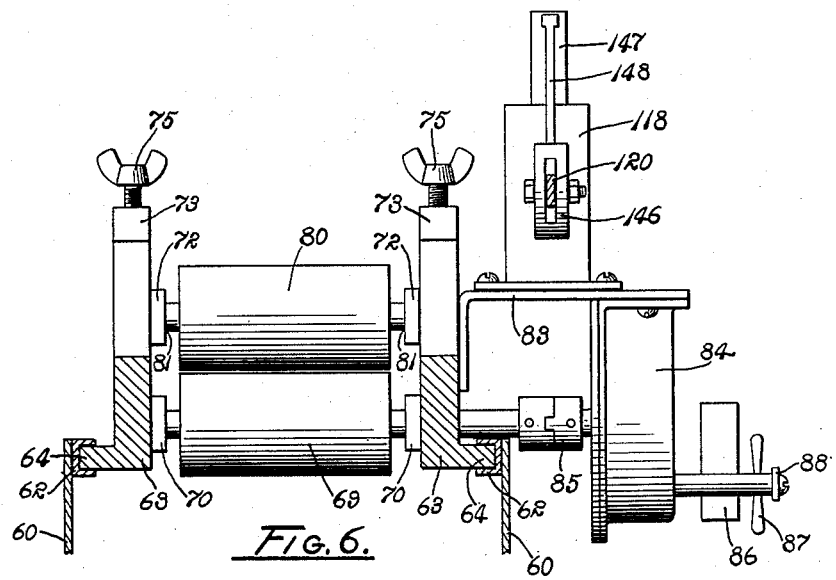
Fig. 6 is a vertical transverse section through the structure taken along line 6—6 of Fig. 3.
Figure 7:
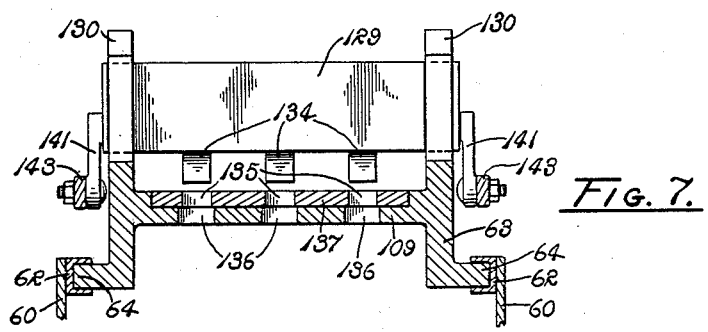
Fig. 7 is a vertical transverse section through the structure taken on line 7—7 of Fig. 3.

A pair of spaced brackets 60 are bolted to the housing 16 as at 61 and extended from the end of the housing opposite to the reel 56. As shown in Fig. 6, the brackets mount a pair of juxtapositioned U shaped tracks 62 in substantially horizontal position. A carriage 63 having track engaging flanges 64 is supported in the tracks for slidable movement in special adjusting relation to the photo printing apparatus 10. The flange 64 of the carriage 63 is provided with a pin receiving bore 65 and at least one of the tracks provided with a series of bores 66. A pin 67 is inserted through the carriage bore 65 into engagement with a selected track bore 66 to lock the carriage in adjusted spaced relation to the photo printing apparatus 10.

A cylindrical lower feed roller 69 is journaled in the carriage as at 70 in a substantially horizontal position with the upper periphery thereof at substantially the same elevation as the window 42, as shown in Fig. 5. A pair of juxtapositioned channels 71 are formed in the carriage 63 above the feed roller 69. A pair of blocks 72 are mounted in the channels for vertical slidable movement. A plate 73 is mounted in closing relation to the upper ends of the channels 71 by cap screws 74. A wing bolt 75 is screw-threadably mounted in each of the plates 73 and provides a spring engaging flange 76 within its respective channel 71. Helical springs 77 are positioned between the blocks 72 and the flanges 76 and by rotation of the wing bolts the resilient effect of the springs in urging the blocks downwardly is adjusted. An upper feed roller 80 is rotatably mounted between the blocks 72, as at 81, in a substantially horizontal position having its lower periphery adjacent to the lower feed roller 69.

As particularly illustrated in Fig. 6, a shelf 83 is mounted on the carriage 63 and extended horizontally therefrom. A transmission 84 is suspended from the shelf 83 and has driving connection with the lower feed roller 69 by means of a coupling 85. A motor 86 has driving connection with the transmission. In the drawing, the motor 86 is shown as employing a fan 87 for cooling purposes having a guard 88 provided thereabout. When the motor is energized, the transmission rotates the lower feed roller at an appreciably reduced speed in a counterclockwise direction, as viewed in Fig. 4, and strip printing paper threaded between the rollers is drawn through the guide 43 and impelled outwardly from the rollers, in a path of discharge shown at 90 in Fig. 4.

Figure 9:
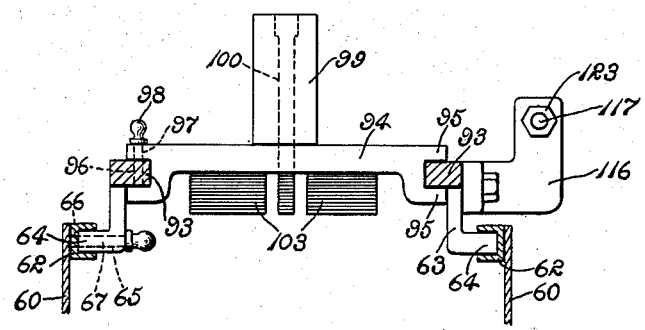
Fig. 9 is a vertical transverse section through the structure as viewed from line 9—9 of Fig. 3.

As shown in Figs. 4 and 9, a pair of rails 93 are mounted on each of the sides of the carriage 63 and downwardly extended therefrom in horizontal parallel relation. A limit switch base 94 having bifurcated end portions 95 fitted to the rails 93 is slidably mounted on the rails for movement in spaced relation to the rollers 69 and 80. One of the rails is provided with a series of bores 96 downwardly therethrough. The adjacent bifurcated end portion 95 of the base 94 has a juxtapositionable bore 97 formed therethrough. A pin 98 is extended downwardly through the bores 97 and 96 to lock the base 94 in position.

A two-way limit switch 99 is mounted on the base 94 and has an operating lever 100 extended therefrom into the path of discharge 90 of the strip printing paper 50. The switch 99 has a normally closed contact 101, diagrammatically illustrated in Fig. 10, and an operably closed contact 102. When the lever 100 is in the normal position illustrated in Fig. 4, the contact 101 is closed and when engaged by strip printing paper and forced into the position shown in dashed line the alternate contact 102 is closed. To facilitate engagement of the printing paper with the lever 100, a guide 103 of sheet material is mounted on the base 94 and extended downwardly and toward the printing apparatus. The guide is slotted, as shown in Fig. 8, for extension of the lever 100 therethrough.

Figure 8:
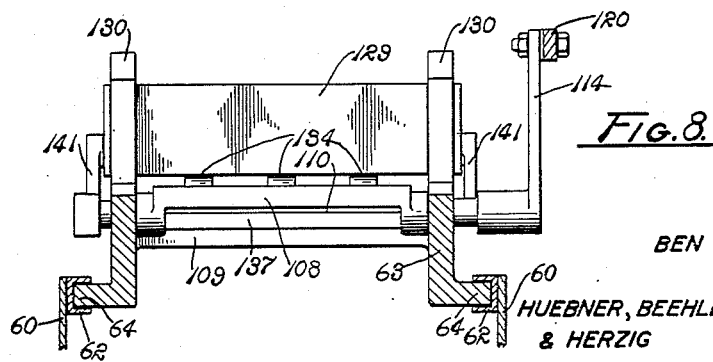
Fig. 8 is a vertical transverse section through the structure as viewed from line 8—8 of Fig. 3.

A tumble knife 108 is rotatably mounted transversely of the path of discharge 90 in the carriage 63, as shown in Fig. 8. A table 109 is mounted between the sides of the carriage 63 in the path of discharge 90 and provides an edge 110 disposed for shearing association with the tumbler knife 108. It is usually desired to provide ornamental edges on the prints cut from the strip printing material 50 so the knife 108 and edge 110 are preferably provided with complementary scalloped configuration. An arm 114 is radially upwardly extended from the knife 108 and provides rocking movement thereof to cut the strip printing material fed between the table and knife by the action of the rollers 69 and 80.

A bracket 116 is mounted on the side of the carriage 63 which supports the transmission 84 and motor 86. The bracket 116 has a strop rod 117 mounted therein for horizontal adjustment. The rod is extended toward the photo printing apparatus. A cutting knife driving solenoid 118 is mounted on the shelf 83 and provides an endwardly reciprocal armature 119 extended toward the rod 117. An L-shaped drive member 120 is pivotally connected to the armature 119. The knife arm 114 is upwardly extended and pivotally connected to the L-shaped drive member 120 whereby reciprocation of said member by operation of the solenoid 118 and armature 119 rocks the knife 108 to and from shearing relation with the edge 110 of the table 109. A top nut 123 is screw-threadably mounted on the rod 117 engageable with the bracket 116 to limit travel of the drive member 120 from the solenoid 118 and thus rocking movement of the knife relative to the table 109. A spring 124 is connected under initial tension between the L-shaped drive member 120 and the bracket 116 tending to retract the member and the knife arm 114 to rock the knife away from the table and/or paper engagement.

A pair of juxtapositioned perforator slide channels 128 are formed vertically in the carriage 63, as shown in Fig. 4. A perforated body 129 is slidably mounted in the channels for vertical movement in a substantially horizontal attitude and retained in the channels by plates 130 secured to the carriage across the upper ends of the channels by cap screws 131. Any desired number of perforating punches 134 are downwardly extended from the body 129 for paper engagement. A like number of openings 135 are formed in the table in positions adapted to receive the punches 134 in perforating paper. Bores 136 are formed upwardly in the table concentrically of the bores 135 for convenient ejection of perforated portions of paper therethrough. It is frequently desirable to substitute bodies 129 having other desired numbers of punches 134 borne thereby for specialized photo printing problems. This necessitates substitution of a portion of the table having the bores 135 formed therein. For this purpose, an insert 137 is formed in the table 109 providing the requisite arrangement and spacing of the openings 135 suited to corresponding punches 134 of the cutting edge 110.

A link 141 is pivotally connected at 142 to opposite ends of the perforator body 129. An arm 143 is radially extended from the knife pivot and the extended end of the arm pivotally connected to the link 141. By referring to Fig. 1, it is evident that when the solenoid 118 is energized to retract the arm 119 to operate the knife 108, the arm 143 and link 141 draws the body 129 of the perforator downwardly extending the perforating punches 134 into the openings 135 effectively perforating printing paper 50 arranged therebetween.

The extended end of the solenoid arm 119 is provided with a shoulder 146. A normally open stop switch 147 is conveniently mounted on the solenoid 118, as shown in Fig. 1, and provides an operating lever 148 extended into the path of movement of the shoulder 146. When the solenoid is energized, the shoulder 146 is drawn against the lever 148 closing the switch 147 for purposes soon to be described.

To eject strip printing material from the discharge path after being severed by the knife 108, a plunger 150 is mounted for reciprocal elevational movement above the path of discharge 90 intermediate the knife and the limit switch 99. A solenoid 151 has driving connection with the plunger and when energized urges the plunger downwardly to strike the previously severed strip printing paper. A discharge chute 152 is located below the plunger 150 and is inclined downwardly therefrom to a pan 153, shown in Fig. 2, containing the developing solution. A control switch 155 is mounted adjacent to the solenoid 26 and provides an operating lever 156 in the path of movement of the printing arm 38. The control switch is normally open and forcibly closed by the printing arm 38 when retracted from the plunger 36.

Figure 10:
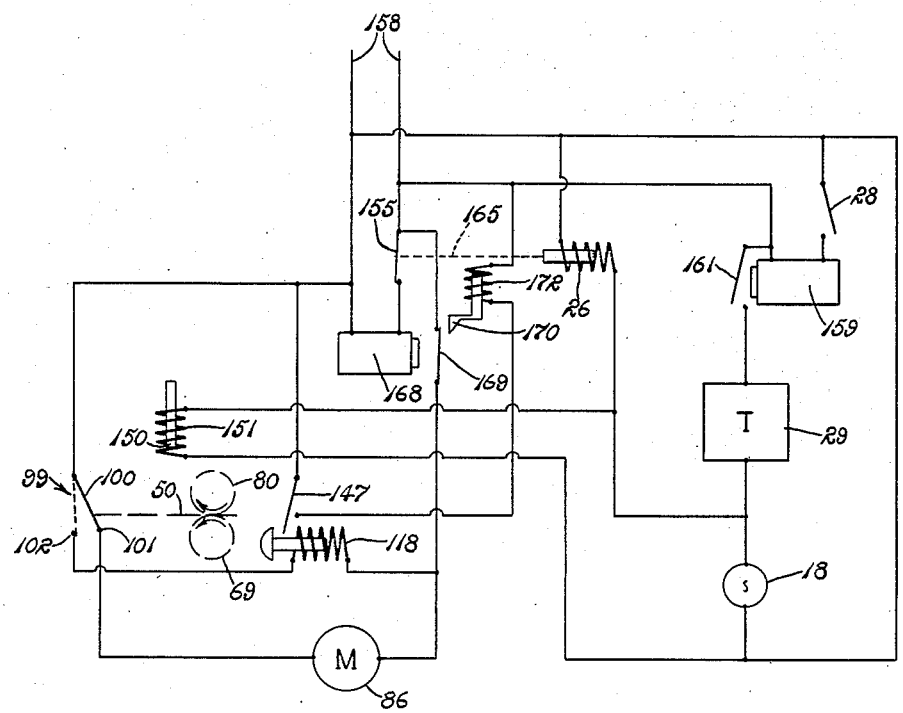
Fig. 10 is a diagrammatic view of the electrical circuit of the combined photo printing apparatus and feeding, cutting and perforating device.

The operating circuits of the photo printing apparatus 10 and the feeding, cutting, and perforating device 11 are shown in Fig. 10 connected to a source of electrical energy represented at 158. The photo printing apparatus employs a relay 159 having a closing coil connected in series with the manual switch 28 to the source of electrical energy. The relay provides a bridging element 161 closed upon energizing of the relay by closing of the control switch. The timer 29 of any suitable form is connected electrically in series with the bridging element 161 of the relay and the lamp 18 with the source of electrical energy 158. The timer may be of any suitable form adapted to interrupt the series circuit of the bridging element, timer, and lamp a predetermined period after energization thereof in response to closing of the bridging element. The solenoid 26 is connected in parallel with the lamp as is the ejector solenoid 151 whereby both of said solenoids are energized concurrently with energization of the lamp 18 and deenergized when the circuit is interrupted by the timer 164. The dotted line 165 in Fig. 10 represents the mechanical linkage including the printing arm 38 which is motivated by the solenoid 26 and which closes the control switch 155 in response to deenergization of the solenoid 26 and retraction of the printing arm. A relay 168 has a holding coil connected in series with the control switch 155 to the source of electrical energy 158. The relay 168 has a bridging element 169 closed by energization of the relay. A mechanical latch 170 serves to hold the bridging element 169 in closed position even after the relay 168 is deenergized. Thus momentarily closing of the control switch 155 closes the bridging element 169 and said bridging element remains closed until the latch 170 is released. The bridging element 169 is electrically connected in series with the motor 86 and the normally closed contact 101 of the limit switch 99 to the source of electrical energy 158. The knife operating solenoid 118 is connected to the alternate contact 102 of the limit switch 99 in parallel relation to the motor 86. The stop switch 147 closed by operation of the solenoid 118 is connected electrically in series to the source of electrical energy with a solenoid 172 connected to the latch 170 so as to release the bridging element 169 from the latch 170 when energized.

*Operation*

The operation of the device of the present invention is believed to be clearly apparent and is briefly summarized at this point. Strip printing paper 50 or other sensitized strip material is mounted in roll form on the reel 56. An end of the strip paper is threaded through the guide 43 which is adjusted to the width of the printing paper employed. The threading is conveniently accomplished by lifting the cover plate 46 for insertion of the paper and releasing the cover plate for gravitational overlaying of the guide and retention of the paper therein. The end of the paper is inserted between the rollers 69 and 80. The timer 29 is adjusted to interrupt its circuits the desired interval after energization thereof in the conventional manner.

An operator positions a negative on the window 19 and the frame 20, and the pane 23 rested on the negative to hold the same precisely in the position desired.

The manual switch 28 is closed by the operator closing the bridging element 161, energizing the lamp 18, energizing the solenoid 151 and printing solenoid 26. As previously described, the solenoid 26 removes the shutter, not shown, from the path of light projected by the lamp through the negative onto the printing paper at the exposure station 25. Simultaneously the solenoid 26 operates the printing device 35 in the manner described to number the back of the printing paper concurrently being exposed. After the time interval determined by the timer 29, the circuit of the timer, lamp, and solenoids are interrupted. Although not shown in detail in the drawings, the relay 159 is of a well-known type, which when closed, remains closed as long as the bridging element 161 thereof continues to carry current. When the timer interrupts the current, the relay opens. As the printing arm retracts upon interruption of the current to the solenoid 26, the control switch 155 is engaged thereby and the relay 168 energized. It is significant that the control switch 155 is closed immediately following completion of the exposure of the printing material at the exposure station 25. Whether this is done by the operation of the printing arm 38 or electrically directly from the timer 29 or the circuits governed thereby is immaterial to the present invention which is deemed sufficiently broad in concept to cover any desired interconnection closing the control switch 155 upon completion of the exposure.

Energization of the relay 168 closes its bridging element 169 starting the motor 86 which rotates the feed roller 69 in a counterclockwise direction, as viewed in Fig. 4. The action of the rollers draws the strip printing paper 50 from the reel through the guide and impels the same in the path of the discharge 90 onto the guide 103 and against the lever 100 of the limit switch 99. The forcing of the paper against the lever disconnects the motor and connects the knife solenoid 118. It will thus be apparent that the positioning of the base 94 in adjusted spaced relation to the rollers 69 and 80 determines the length of the paper that is extended before the cutting operation is initiated. When the solenoid 118 is energized, the mechanical linkage previously described including the arm 114, rocks the knife into shearing engagement with the edge 110 of the table insert 137 severing the strip in a predetermined length.

Concurrently the connection of the arm 143 and link 141 draws the body 129 of the perforator downwardly and forces the perforator punches through the paper and into the openings 135, perforating the end of the strip material adjacent to the cut made by the knife 108.

Upon completion of the cutting and perforating operations, the shoulder 146 of the solenoids 118 strikes the operating lever 148 of the normally open stop switch 147 closing the switch. When the switch 147 is closed the solenoid 172 is energized, retracting the latch 170 from the bridging element 169 which springs open, interrupting its circuit.

This completes a cycle of operation. Obviously, a portion of strip material will be wasted in getting the exposed portion thereof extended outwardly for cutting. As the exposed perforated and severed portions of the printing paper 50 are cut from the strip by the knife 108 they normally gravitate down the chute 152 into the developing pan 153. In the event the knife 108 does not completely sever the paper, upon the operation of the manual switch 28 to expose a succeeding portion of the paper, the ejecting solenoid 151 is energized and its plunger 150 thrust downwardly forcibly discharging the severed portion downwardly into the chute.

Pictures are developed by the structure of the present invention without the handling of any of the sensitized strip printing material, thus obviating marks and other damage conventionally experienced as a result of such handling. The printed pictures are of more uniform quality and much more speedily prepared inasmuch as the operator need only concern himself with the positioning of successive negatives at the negative station 21 and the operation of the manual switch 28 whenever an exposure is desired. Not only does the minimizing of the operator's efforts result in the greater speed but substantially reduces the cost of printing photographs.

The perforating structure described is optionally employed but in modern day photography normally desired. The perforations are employed to bind pluralities of photo prints into booklets in the well known commercial form.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent devices and systems.

Having described my invention, what I claim as new and desire to secure by Letters Patent is:

1. In combination with a photo printing apparatus having a negative station adapted to receive photographic negatives to be printed, an exposure station adapted to receive sensitized printing material, a source of light arranged to project light rays through negatives positioned at the negative station onto sensitized printing material at the exposure station, manually controlled means for initiating energization of the source of light, and timing means adapted to interrupt energization of the source of light after a predetermined period; a feeding and cutting attachment comprising a reel mounted at one side of the printing apparatus adapted to receive a roll of strip sensitized printing material thereon, a guide mounted at the exposure station adapted threadably to receive therethrough printing material from the reel, printing material feeding means mounted on the printing apparatus opposite to the printing station from the reel, guide means for the printing material extended from the feeding means, a limit switch mounted in the guide means engageable by printing material fed therethrough, a cutting knife mounted in the guide means intermediate the limit switch and the feeding means, a perforating punch mounted above the guide means for reciprocal positioning into the guide means, and a control circuit including a source of electrical current, the manually controlled means, the timing means of the photo printing apparatus and the limit switch of the feeding and cutting attachment arranged to energize the feeding means in response to interruption of the energization of the light source, to interrupt the feeding means in response to the engagement of the limit switch by sheet material fed through the guide means concurrently with activation of the cutting knife and perforator punch, and to interrupt activation of the cutting knife and perforator punch in response to movement of the perforator punch into the guide means, the manually controlled means being adapted to re-initiate the operational sequence by effecting energization of the light source.

2. In combination with a photo printing apparatus having an exposure station for sensitized printing material, a source of light, manually controlled means for initiating illumination of the exposure station from the source of light, and a timing device for interrupting illumination of the exposure station a predetermined period after the initiation of the illumination thereof; a feeding and cutting attachment for rolled sensitized strip printing material comprising a reel mounted on the printing apparatus adjacent to the exposure station adapted to receive a roll of strip printing material thereon, a guide mounted at the exposure station for the threaded reception of the strip material therethrough, electrically actuated feed rolls mounted adjacent to the guide on the apparatus opposite to the exposure station from the reel, a discharge guide for the strip material extended from the feed rolls, a two-way limit switch having an operating lever extended into the discharge guide in spaced relation to the feed rolls engageable by printing material fed thereto, said switch having a normally closed position and an alternately closed position into which it is urged by strip material contact, a cutting knife mounted transversely of the discharge guide intermediate the limit switch and the feed rolls, a perforating punch mounted above the path of discharge intermediate the cutting knife and the feed rolls for reciprocal movement into the discharge path and having mechanical connection with the cutting knife for corresponding operation thereof, a relay having a closing coil and an electrical bridging element, a control switch connected electrically in series with the closing coil of the relay, releasable means for latching the bridging element of the relay in closed position, an electrical circuit having controlled connection to the control switch closing said switch in response to interruption of the illumination of the exposure station of the photo printing apparatus, an electrical circuit connecting the normally closed position of the limit switch, the motor, and the relay bridging element in series to the source of electrical current, an electrical circuit connecting the alternately closed position of the limit switch in series with the solenoid and the relay bridging element to the source of electrical current, a normally opened stopping switch having mechanically controlled connection to the solenoid whereby operation of the solenoid closes the stopping switch, a releasing solenoid connected to the releasable latching means for the bridging element of the relay, an electrical circuit connecting the stopping switch and the releasing solenoid electrically in series to the source of electrical current, a resiliently retracted plunger mounted for forcible movement into the discharge guide intermediate the limit switch and the cutting knife; an ejector solenoid having driving connection with the plunger for reciprocation thereof into the discharge guide, and an electrical circuit connected to the timing device of the printing apparatus energizing the ejector solenoid concurrently with the illumination of the exposure station.

3. A photo printing apparatus comprising a negative station, stationary means for releasably holding negatives at the negative station, an exposure station in spaced relation to the negative station, a lamp arranged to project light through the negative station into the exposure station, a reel for strip printing material mounted at a side of the exposure station, a guide for strip material mounted at the exposure station adapted threadably to receive strip material from the reel, a pair of feed rollers rotatably mounted opposite to the guide from the reel adapted to receive strip material from the guide and upon motivation to discharge the strip material in a predetermined path of travel, a motor in driving connection with a feed roller, a limit switch mounted in spaced relation to the driving means in said path of travel of the strip material, said limit switch having a normally closed contact and an alternate contact closed by engagement of the limit switch with strip material discharged by the feed rollers, a cutting knife mounted between the limit switch and the feed rollers for reciprocal movement to and from the path of travel of the strip material, a lamp energizing relay having a closing coil and an electrical bridging element, a manual control switch connected electrically in series with the closing coil of the relay, a timer electrically connected in series with the bridging element of the relay and the lamp, a motor energizing relay having a closing coil and an electrical bridging element, a motor switch wired electrically in series with the operating coil of the motor relay, a solenoid electrically connected in series with the lamp relay, a solenoid electrically connected in series with the lamp relay and the timer mechanically connected to the motor switch whereby the switch is maintained in open condition when the solenoid is energized and is closed by de-energizing the solenoid, means connecting the normally closed contact of the limit switch in series with the motor and with the bridging element of the motor relay, a solenoid having driving connection to the knife connected in series with the alternate contact of the limit switch and the bridging element of the motor relay in parallel relation to the motor, a latch mounted in releasable engagement with the bridging element of the motor relay adapted releasably to retain the bridging element in closed position, a solenoid having controlled connection to the latch adapted to release the latch when energized, and a normally open stop switch connected electrically in series with the latch solenoid and having mechanical connection to the knife solenoid whereby movement of the knife a distance sufficient to cut the strip material incident to knife solenoid operation closes the stop switch and energizes the latch solenoid to release the latch.

References Cited in the file of this patent

UNITED STATES PATENTS

| Number | Name | Date |
|---|---|---|
| 110,631 | Coffin | Jan. 3, 1871 |
| 1,385,369 | Ferrie | July 26, 1921 |
| 1,976,318 | Young et al. | Oct. 9, 1934 |

FOREIGN PATENTS

| Number | Country | Date |
|---|---|---|
| 257,430 | Switzerland | Apr. 1, 1949 |